Nov. 19, 1940.  J. T. HAYWARD ET AL  2,221,767
APPARATUS FOR MEASURING WELL DEPTHS AND WELL STRINGS
Filed June 16, 1939  3 Sheets-Sheet 1

INVENTORS
J. T. HAYWARD
E. H. COOLEY
BY
ATTORNEY

Nov. 19, 1940.                J. T. HAYWARD ET AL                2,221,767
           APPARATUS FOR MEASURING WELL DEPTHS AND WELL STRINGS
                      Filed June 16, 1939        3 Sheets-Sheet 2
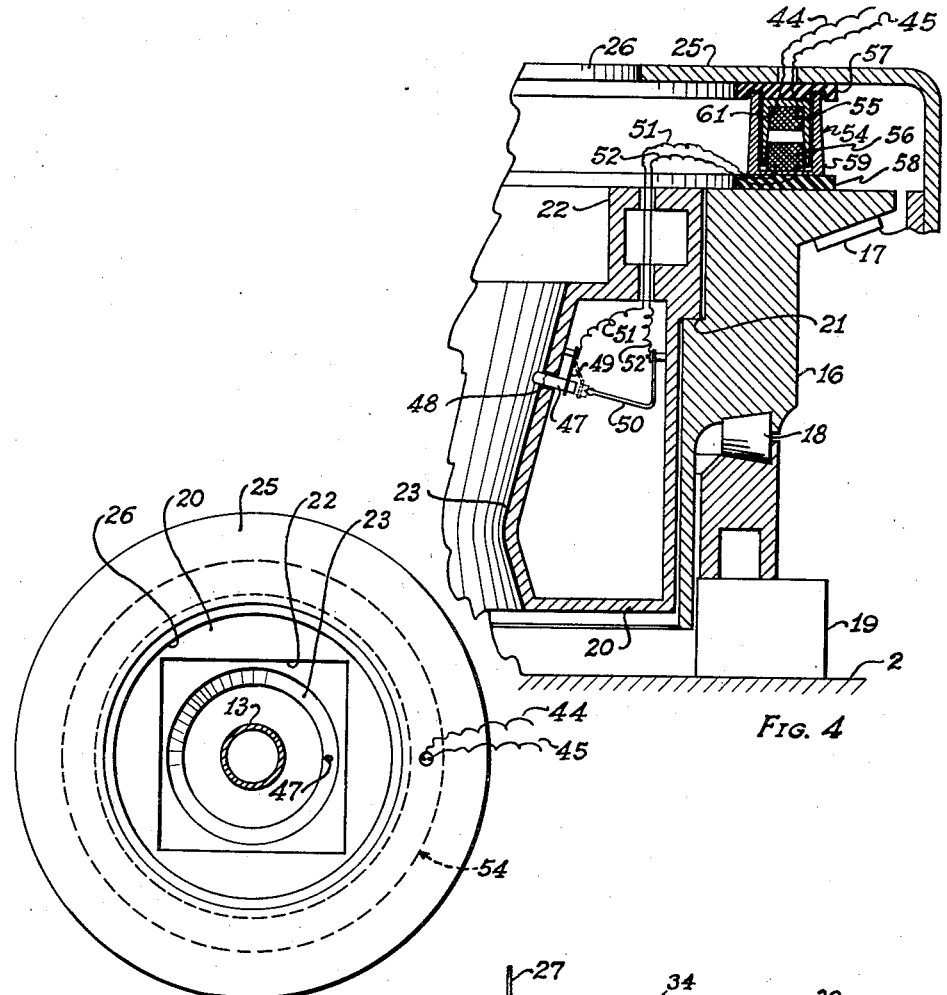
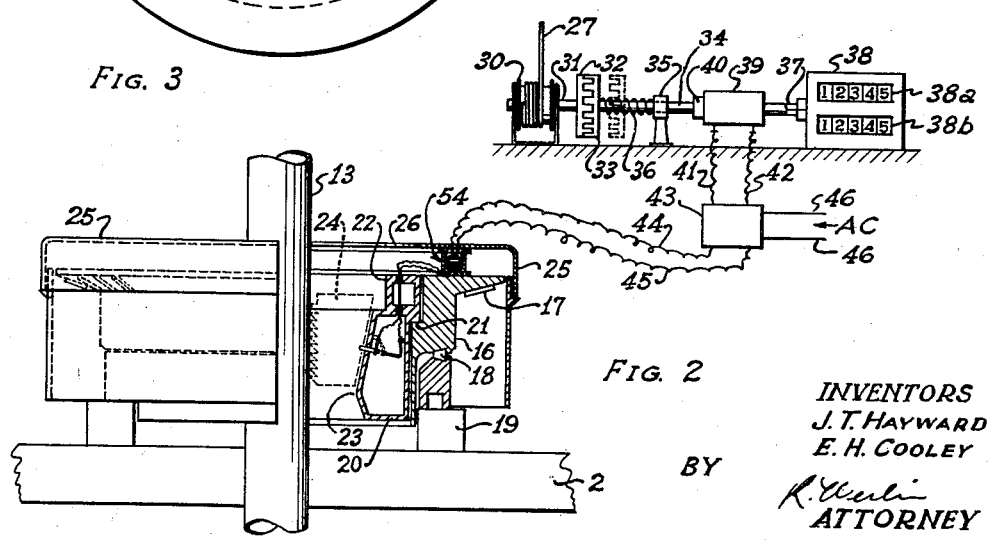
INVENTORS
J. T. HAYWARD
E. H. COOLEY
BY
ATTORNEY Nov. 19, 1940.   J. T. HAYWARD ET AL   2,221,767
APPARATUS FOR MEASURING WELL DEPTHS AND WELL STRINGS
Filed June 16, 1939   3 Sheets-Sheet 3
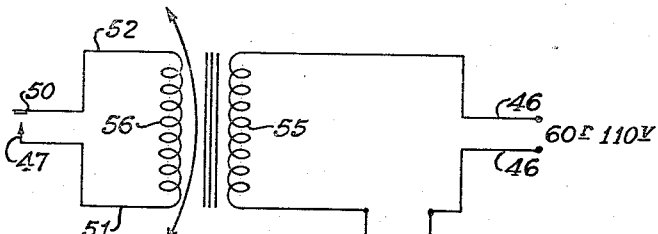
Fig. 6
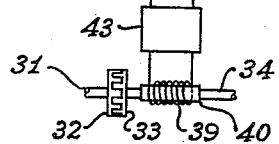
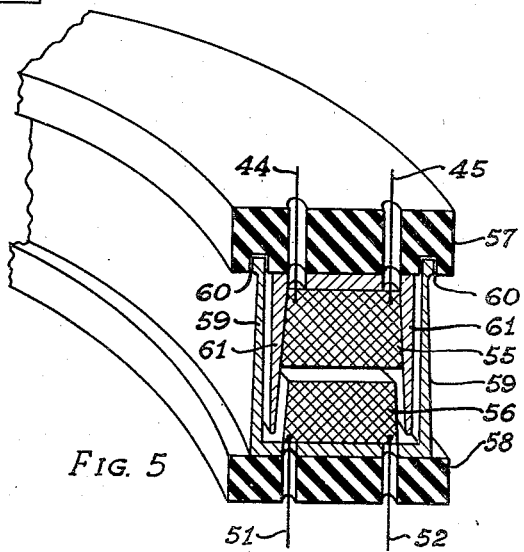
Fig. 5
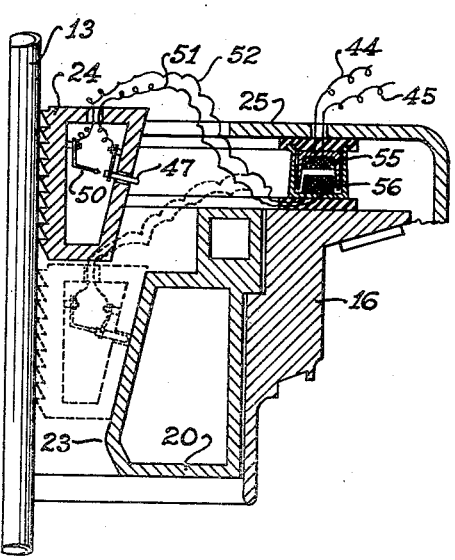
Fig. 7
INVENTORS
J. T. HAYWARD
E. H. COOLEY
BY
ATTORNEY Patented Nov. 19, 1940

2,221,767

UNITED STATES PATENT OFFICE 2,221,767

APPARATUS FOR MEASURING WELL
DEPTHS AND WELL STRINGS

John T. Hayward and Elihu H. Cooley,
Tulsa, Okla.

Application June 16, 1939, Serial No. 279,422

9 Claims. (Cl. 33—125)

This invention relates to improved apparatus for measuring well depths and well strings of pipe.

In the co-pending application of John T. Hayward, Serial Number 181,796, filed December 27, 1937, there is described a novel form of apparatus for measuring well depths and well strings of pipe, whereby the depth of wells or the length of pipe strings, which are a measure thereof, are measured by measuring the selected vertical movements of the pulley block from which such pipe strings are normally suspended when being moved in and out of a well. The selected movements of the pulley block are measured by means of a measuring line attached thereto and extending to a measuring reel, which is in turn connected by a releasable electro-magnetic clutch to a register for recording the selected measurements. Since only those movements of the pulley block are measured and recorded which take place with the actual movement of pipe in and out of the well, novel switching apparatus was provided for selecting these movements of the pulley block from all the other movements ordinarily engaged in by such blocks, and for permitting only the selected movements to be transmitted to the register. The novel switching apparatus comprised a normally open switch mounted in the wall of the usual slip bowl present in the conventional rotary table through which the well strings were raised and lowered, and was connected by electric leads in circuit with the said electro-magnetic clutch connecting the measuring reel to the register. The switch was adapted to be closed upon the insertion of slips into slip bowl, which is normally done when it is desired to add or remove sections of pipe from the well string. The closing of the switch actuated the electro-magnetic clutch to effect release of the register from the measuring reel, and to thereby prevent the recordation of those movements of the pulley block normally incidental to the addition or removal of sections from the well string, but which do not contribute to the measurements desired. A slip ring connection was provided in the electric circuit between the rotary table and the electro-magnetic clutch in order to maintain an unbroken electrical connection between the switch and clutch even though the rotary table was being rotated, as is frequently the case.

The present invention is a continuation-in-part of the above referred to co-pending application Serial No. 181,798, in that it is directed to improvements in the electrical apparatus providing connection between the above described switching mechanism in the rotary table and the electro-magnetic clutch connected to the register, and relates particularly to an improved form of connection to replace the slip-ring mechanism employed in the apparatus of the co-pending application.

The slip ring connection described in the former application is open to several serious objections to its use in and around well drilling equipment, because the contact surfaces of slip ring and brush connections are necessarily open and exposed to oil, grease, dirt, and mud, ever present about a drilling rig, imperfect contact may frequently result, with consequent imperfect operation of the measuring apparatus, and there is also great danger of arcing which may produce sparks which might be exceedingly disastrous when oil or gas is present about the well, as is frequently the case.

The particular improvement contemplated by this invention is the provision of a novel form of rotatable inductive coupling which is adapted to maintain continuous electrical coupling between the switch in the rotary table and the measuring apparatus, whether the rotary table is in motion or not. The coupling comprises a pair of spaced circular induction coils concentrically arranged, the wires forming each coil being circularly wound about a common axis at right angles to the plane of the coils. One of the coils is mounted on the rotary table concentric with the slip bowl and adapted to rotate with the table, while the other coil is held in fixed position as by attachment to the conventional rotary guard plate, and is spaced slightly from the first coil and concentric therewith. The first, or rotatable coil is connected by leads to the switch contacts in the rotary table, while the second, or fixed coil is connected by leads to a current source and the electro-magnetic clutch connecting the measuring reel to the register. By virtue of the symmetrical form and arrangement of the coils, the magnetic symmetry thereof will be unchanged by the rotation of one coil with respect to the other, that is, considering the rotating coil as the secondary and the stationary coil as the primary, the flux linkages in the secondary due to current in the primary remain invariant and independent of the relative rotation of the primary and secondary. Thus, while the switch in the rotary table is open or closed, the rotation itself of the table produces no effect upon the electro-magnetic clutch of the measuring apparatus. However, when the switch is open the only current flowing in the primary is the transformer magnetization current which is insufficient to operate the magnetic clutch, but when closed there is a very appreciable increase in the flow of current in the primary sufficient to operate the magnetic clutch as will be described in greater detail hereinafter.

It is, therefore, a principal object of this invention to provide an improved form of apparatus for measuring well depths and well strings of pipe by measurement of the selected movements of a pulley block employed to raise and lower the strings in the well.

Another object is to provide improved electrical apparatus employed to automatically select the movements to be measured.

A more specific object is to provide a rotary table adjacent a well in which a well string is being raised and lowered, an improved form of electrical switching mechanism mounted in the slip bowl of said table and adapted to be actuated by insertion of slips therein to close an electrical circuit to a measuring apparatus.

A more particular object is to provide a novel form of rotatable inductive coupling for electrically connecting the switch mechanism of the rotary table with the measuring apparatus.

Other and more specific objects of this invention will be readily apparent from the following detailed description when read in conjunction with the accompanying drawings which illustrate a preferred form of the apparatus of this invention.

In the drawings:

Fig. 2 is a view, partly in section, of a rotary table, showing the electrical connection therein and the measuring apparatus connected thereto.

Fig. 3 is a plan view of the rotary table of Fig. 2.

Fig. 4 is an enlarged detail of a portion of the rotary table showing the electrical connections therein.

Fig. 5 is an enlarged sectional detail of the rotatable inductive coupling employed in the apparatus of this invention, and Fig. 6 is a simplified schematic diagram of the electric circuit involved.

Fig. 7 is an enlarged detail of another modification of the apparatus of this invention.

Figure 1:
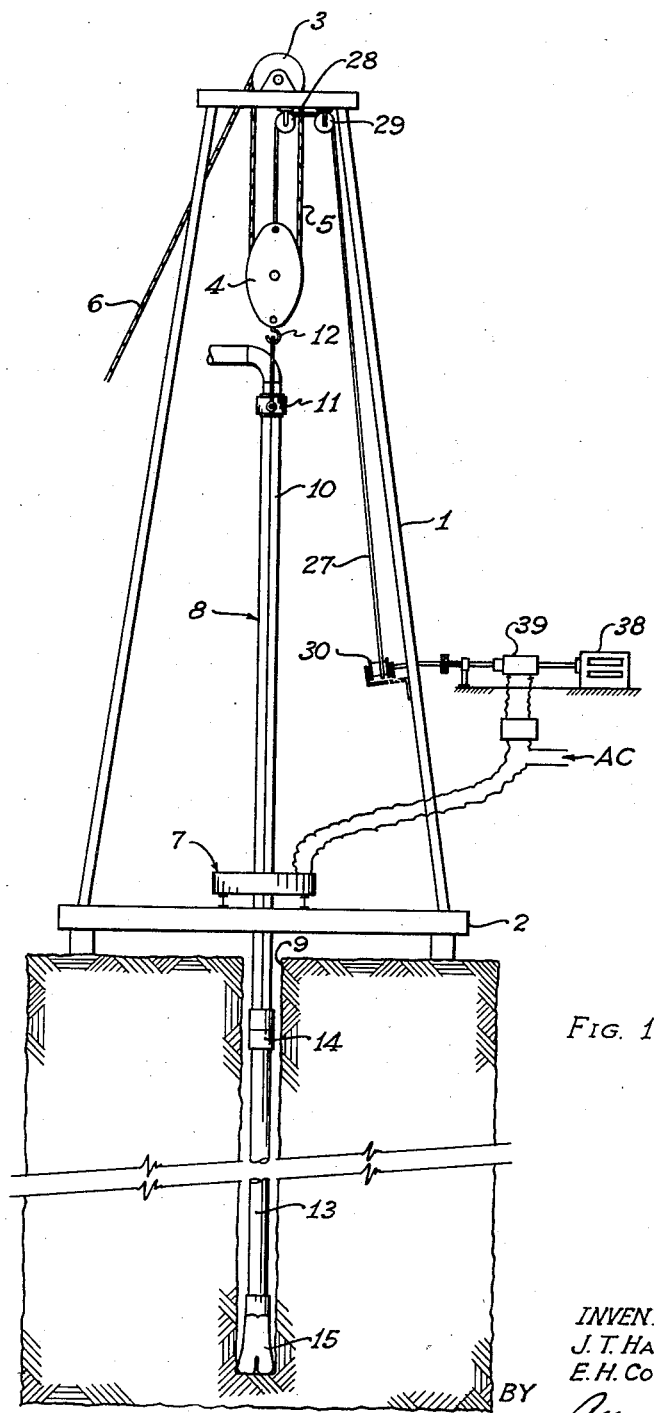
Fig. 1 is a general assembly of a well rig, showing the general arrangement of the measuring apparatus connected thereto.

Referring to the drawings and Fig. 1, particularly, it will be seen that a conventional rotary drilling rig is herein illustrated. The principal portion thereof consists of a derrick 1, mounted on a floor 2, a crown block pulley 3 from which a conventional traveling block 4 is suspended by means of the usual wire cables 5 terminating in the hoisting or drilling line 6, movement of which about the crown pulley 3 controls the raising and lowering of traveling block 4. Mounted on the derrick floor is a conventional rotary table 7 through which the usual drilling string indicated at 8 extends into the well bore 9. Drilling string 8 consists of a rotary drive member or kelly 10 attached by a swivel 11 to a hook 12 suspended from traveling block 4, hollow drill pipe 13 connected by a coupling 14 to the kelly, and a drill bit 15 attached to the lower end of the drill pipe. It will be understood that the apparatus of this invention will also be employed when drill pipe or casing is being raised or lowered in the well, in which case the kelly 10 and swivel 11 may not be used, the hook 12 being connected to such pipe or casing by means of conventional elevators, not shown, but as is well understood by those skilled in the art of well drilling.

The rotary table, shown in greater detail in Figs. 2, 3, and 4, consists of a rotary cylinder 16 about the upper edge of which is mounted a ring gear 17, which is adapted to be rotatively driven in the conventional manner by a pinion, not shown, and is rotatably mounted on roller bearings 18. The entire assembly is supported on a base member 19 which is in turn supported upon floor 2 of the derrick. A hollow master bushing 20 is supported within cylinder 16 on shoulders 21 formed in the inner wall thereof near its upper end, and the upper end of the interior bore of master bushing 20 is cut away to form a square seat 22 adapted to receive the usual square rotary bushing, not shown. The bore of master bushing 20, below seat 22 tapers downwardly and inwardly to form a conical surface, generally termed the slip bowl 23 adapted to receive toothed slips 24, shown in dotted outline in Fig. 2, into wedging engagement with pipe 13 for holding the pipe stationary in the well and for other purposes to be more fully described hereinafter. Rotary table 7 is enclosed by a guard plate 25 which extends over the upper surface and around the periphery thereof and is fixedly attached to base member 19. The top of guard plate 25 is spaced vertically from the upper surface of the rotary table and is provided with a central opening 26 to permit insertion and removal therethrough of the master bushing, rotary bushing, slips, pipe and other tools as required.

The measuring apparatus for measuring the movements of drill pipe or casing in and out of the well (Figs. 1 and 2) comprises a measuring line 27 of conventional construction, which is attached at one end to traveling block 4 and is thence led vertically over pulleys 28 and 29, suspended from the top of the derrick, to a measuring reel 30 also of conventional construction, so that each turn of line 27 thereon will represent a known length of line. Measuring reel 30 is mounted on a shaft 31 on one end of which is mounted a stationary clutch member 32, which is engageable by a movable clutch member 33 mounted on a shaft 34 which is slidably mounted in a bearing 35. A coil spring member 36 extends along shaft 34 between clutch member 33 and bearing 35 and is adapted to normally hold clutch member 33 in engagement with clutch member 32. The opposite end of shaft 34 is connected by means of a spline connection 37 to a register 38. A solenoid 39 surrounds a portion of shaft 34 between bearing 35 and register 38 and an iron core 40 is fixedly attached to this portion of shaft 34 so that when current is applied to solenoid 39, it acts to draw core 40 and shaft 34 in the direction of register 38 against the resistance of spring member 36 to thereby disengage the clutch members and disconnect the register 38 from measuring reel 30. Current leads 41 and 42 lead from solenoid 39 to a current rectifier 43 which is in turn connected by leads 44 and 45 to the primary winding 55 of a rotatable inductive coupling designated by the numeral 54, mounted in the rotary table 7, as will be later described, and to a source of alternating current supplied by leads 46—46.

The electrical connections in rotary table 7 in circuit with solenoid 39 include a normally open switch, mounted in the hollow space between the walls of master bushing 20, the outer wall of which forms the wall of slip bowl 23. The switch consists of a contact pin 47 which extends through an opening 48 in the wall of slip bowl 23 and is provided with a rounded end which protrudes into the slip bowl. The other end is connected by a detent 49 to the inner face of the wall of the slip bowl. A second switch contact 50 is mounted on the opposite wall of the master bushing and is normally out of engagement with contact pin 47. When slip 24 is inserted in slip bowl 23, the lateral compression of the slips, particularly when the weight of pipe 13 is transferred thereto forces contact pin 47 into contact with contact 50, as shown in dotted outlines in Figs. 2 and 3 to thereby close the switch. Contacts 47 and 50 are connected by leads 51 and 52 respectively to the secondary winding 56 of inductive coupling 54, the leads 51 and 52 passing through suitable openings in the body of master bushing 20 (Fig. 4).

The rotatable inductive coupling 54 consists of primary winding 55 and secondary winding 56, which are annular in form, the coils thereof being wound circularly about a common axis at right angles to the planes of the coils. The primary winding 55 is fixedly attached by means of an insulating support 57 to the underside of guard plate 25, and is spaced vertically from the secondary winding 56 which is fixedly attached by an insulating support 58 to the upper face of rotary cylinder 16. Both windings are positioned concentrically with respect to the vertical axis of the rotary table and may be parallel with each other as shown, or concentric with each other. The secondary winding 56 is thus rotatable relative to the primary winding and rotates with the rotary table. Secondary winding 56 is seated in an upwardly facing U-shaped iron ring 59, the legs of which move in annular grooves 60 in insulating support 57 to guide the relative movement of the windings. Primary winding 55 is also seated in a downwardly turned U-shaped iron ring 61 which fits within the sides of ring 59 but is out of contact therewith.

These iron rings serve to improve the inductive efficiency of the windings and to complete the magnetic path around them. The terminals of winding 55 are connected to leads 44 and 45 while those of winding 56 are connected to leads 51 and 52. The electrical circuit employed is illustrated schematically in simplified form in Fig. 6. By the form and symmetrical arrangement of the windings 55 and 56, no current, or at most, only the relatively small transformer magnetization current will flow in the primary circuit, which includes winding 55, when switch contacts 47 and 50 are separated, and this will be true, regardless of the position of winding 56 relative to winding 55, and whether winding 55 is in rotation or stationary. If desired a Wheatstone bridge arrangement may be built into the primary circuit so that the magnetization current will be balanced out and no current at all will then flow in the primary winding when the switch 47—50 is open. Alternating current of any desired frequency and voltage characteristics, for example 60 cycle, 110 volts, is impressed through leads 46—46 on the primary circuit, which is connected to solenoid 39. Since solenoid 39 is preferably operated by direct current, a rectifier 43, such as the conventional copper oxide rectifier, is interposed across leads 44—45 to rectify the alternating current to direct current before it enters solenoid 39.

With switch 47—50 open, no current, if the bridge balance is used or insufficient current, if not, will flow in the winding of solenoid 39 to actuate the solenoid, and clutch 32—33 will remain engaged under the action of spring member 36, and the register 38 will record the movements of the measuring reel 30. When the switch 47—50 is closed, a relatively large current is immediately permitted to flow in primary winding 55, and this change in current will immediately actuate solenoid 39 to draw clutch member 33 out of engagement with member 32 and so disconnect the register 38 from the measuring reel 30.

The above described apparatus is employed in the following manner in measuring well depths and well strings of pipe: The depth of a well being drilled, or which has been drilled is preferably measured by measuring the length of the drill pipe used in drilling, during the drilling of the well. As the well increases in depth, sections of drill pipe must be progressively added to the drilling string. Each addition of a section, requires that the drilling be stopped and the string partially withdrawn from the well to first permit removal of the Kelly joint 10, then the new section of pipe is added, the Kelly joint reconnected to the string and the string lowered to the bottom of the well, whereupon drilling is resumed for another interval corresponding in depth to the length of the Kelly joints. Of these several operations only those representing changes in depth of the well and changes in length of the pipe string extending into the well are desired to appear on register 38, which is preferably a duplex register, having two dials, one of which is designated 38b and shows continuously that maximum depth of the well, while the other is designated 38a and shows the length of pipe suspended in the well. All measurements are preferably made with respect to some suitable measuring point such as the top of the rotary table.

For the purpose of illustration, the case of a drilling well will be described. Assume the well to be at a particular depth which is recorded on the register 38. Both dials will record the same measurements since the drill pipe is on bottom at the moment, and the Kelly joint 10 is at the position shown in Fig. 1 preparatory to drilling down an amount substantially equal to the length of the Kelly joint. During such drilling the slips 24 will, of course not be in use since free movement of the drill string is desired. Switch 47—50 will be open, therefore, and clutch 32—33 will be engaged, so that downward movement of the drill string will be recorded on both dials of register 38, which will continue to record equal measurements because the drill string is "on bottom." Having drilled down the length of the Kelly joint with corresponding increases in the measurements appearing on register 38, it is now desired to add a new section of drill pipe. The drill string is then drawn upwardly by means of pulley block 4 until the lower end of the Kelly joint and the upper end of the drill pipe appear above the rotary table. This reverse movement will be recorded on the pipe measuring dial 38a of register 38 as a corresponding reduction in the measurement appearing thereon and this dial will thus record the length of pipe remaining in the well. Dial 38b which is preferably a maximum measurement recorder, will not show this change and will continue to record the maximum depth of the well. In order to add the new section of drill pipe the Kelly joint first must be unscrewed. Accordingly, slips 24 are dropped into the slip bowl 23, and the weight of the drill string transferred thereto. This operation depresses switch contact pin 47 into contact 50 and as above described causes an increase in the current flowing in primary winding 55 of the inductive coupling which in turn actuates solenoid 39 to effect disengagement of clutch 32—33 and release of register 38 from measuring reel 38. All the necessary operations incidental to removal of the Kelly joint, addition of a new section of pipe and replacement of the Kelly joint on the drill string may now be performed by pulley block 4 and none of the movements thereof will be recorded on the register 38. When it is desired to resume drilling operations, the slips 24 are withdrawn from the slip bowl causing switch 47—50 to again open and thereby cause release of the armature 40 of solenoid 39 with consequent re-engagement of clutch 32—33. The drill string is then lowered to the bottom of the well and this movement is recorded on the pipe measuring dial 38a which, when the drill string is again "on bottom" will again record a measurement equal to that shown as maximum depth on dial 38b, which shows no change since no change in depth of the well has yet taken place. The drilling then proceeds and the new changes in well depth and length of pipe in the well are recorded on the respective dials 38a and 38b. This operation is repeated throughout the drilling of the well and the driller is thereby continuously and accurately appraised, at all times of the maximum depth of the well and the length of drill pipe in the well. The measuring operations are thus always automatic, rapid and accurate within extremely small margins of error, and no significant movements of the drill string can escape the measuring apparatus.

It will be understood that the same apparatus may be employed when running casing, tubing or other objects in the well to accurately and automatically measure the lengths thereof.

The described rotatable inductive coupling provides a novel connection for maintaining continuous electric coupling between the rotary table and the measuring apparatus, which is positive in its function, is undisturbed by rotation of the rotary table, is free from sparks and arcing, and is not subject to frictional wear or other disturbances to which exposed slip rings or other mechanical connections are exposed.

Fig. 7 illustrates a modified form of the invention in that the switch contact members 47 and 50 are positioned within the slips 24, the contact pin 47 protruding from the rear face of the slip which contacts the wall of slip bowl 23. Otherwise the arrangement of parts is identical with the modification previously described. By the modified arrangement of Fig. 7, the switch 47—50 is closed when the slip 24 is inserted in the slip bowl, the weight of the slip and of the pipe 13 when transferred thereto, acting to close the switch 47—50 by lateral compression applied thereto.

It will also be readily apparent that by slight changes in the form of the switch mechanism and in the position and form of solenoid 39 and spring 36, clutch 32—33 may be held in engagement while the circuit connecting the solenoid and switch is maintained in normally closed position, and upon insertion of the slips into the slip bowl and transfer of the weight of the pipe thereto, the switch may be opened thereby opening the circuit and causing solenoid 39 to release one of the clutch members to thereby disengage the register from the measuring reel.

It will also be readily understood that a plurality of switches may be used, which are spaced about the slip bowl, or placed in each of the slips, and may be connected into the circuit so that all of them must be opened or closed, as the case may be, to actuate the measuring apparatus. Such an arrangement may be useful, where, as is frequent practice, one slip or a pair of slips, in case more than two are used, is dropped into the slip bowl before the drill pipe or casing comes to a complete stop, preparatory to adding or removing sections and the remaining slips are then dropped into the bowl, when the movement of the pipe or casing is finally stopped.

While the preferred embodiment of the inductive coupler is that illustrated as comprising concentric annular coils, it will be understood that any other form may be employed, the relative rotation of which do not alter the magnetic symmetry thereof. The primary winding may be of the form shown in the drawings while the secondary may be of any other form having reasonable magnetic coupling with the primary, provided however, that the secondary rotate in a path which is concentric with the primary coil.

It will be understood that the term electromagnetic is used herein in its wider sense, and includes electrostatic phenomena. Also it will readily be understood that where the coupler is described as operating by change in amount of current in the primary, the operation may be effected equally as well by introduction of current of a different frequency from the secondary into the primary, as will be readily apparent to one skilled in the art.

Various other alterations and changes may be made in the size, form and arrangement of the details of the described apparatus without departing from the scope of the appended claims.

What we claim and desire to secure by Letters Patent is:

1. In apparatus for registering movements of objects relative to a well, a support member adjacent said well and having an opening therein in axial alignment with said well, said support member including relatively movable elements a register for registering movements of objects longitudinally within said opening, an electrically operated releasable connection member normally placing said register in movement-registering connection with mechanism controlling the said movement of said objects, an electrical circuit connecting said releasable connection member with said support member, switch means in said circuit positioned adjacent said opening, said switch means being operated by a compressive force radially applied from within said opening to alter the current flow in said circuit to thereby effect release of said connection member, means removably insertable in said opening for applying said compressive force to operate said switch means, and an inductive coupling member in said circuit between said support member and said releasable connection member, said coupling member including interacting coils separately mounted in inductive relationship to each other on said relatively movable elements of the support members respectively.

2. In apparatus for registering movements of objects relative to a well, a rotatable support member adjacent said well and having an opening therein in axial alignment with said well, said support member including relatively movable elements a register for registering movements of objects longitudinally within said opening, an electrically operated releasable connection member normally placing said register in movement registering connection with mechanism controlling the said movement of said objects, a normally open electrical circuit connecting said electrically operated connection member with said support member, circuit closing means positioned in said support member to close said circuit to thereby release said connection member, said circuit closing means comprising a normally open switch member positioned adjacent said opening and adapted to be closed by a compressive force radially applied from within said opening, means removably insertable in said opening for applying radial compression therein for closing said switch member, and an inductive coupling member in said circuit between said support member and said releasable connection member, said coupling member including interacting coils separately mounted in inductive relationship to each other on said relatively movable elements of the support member respectively.

3. In apparatus for registering movements of objects relative to a well, a rotary table adjacent the top of said well, said rotary table including relatively movable elements, a register for registering movement of objects longitudinally within said well, an electro-magnetically releasable clutch member normally placing said register in movement-registering connection with said objects, a slip bowl in said rotary table through which said objects move, slips insertable in said slip bowl, an electric circuit connecting said clutch member to said slip bowl, normally open switch means in said circuit positioned in said slip bowl, said switch means being adapted to be closed upon the insertion of said slips in said slip bowl to thereby close said circuit and release said clutch member, and a rotatable inductive coupling positioned in said circuit between the rotary table and said clutch member, said coupling including interacting coils separately mounted in inductive relationship to each other on said relatively movable elements of said rotary table respectively.

4. In apparatus for registering movements of objects relative to a well, a rotary table adjacent the top of said well, said rotary table including relatively movable elements, a register for registering movements of objects longitudinally within said well, an electro-magnetically releasable clutch member normally placing said register in movement-registering connection with said objects, a slip bowl in said rotary table through which said objects move, slips insertable in said slip bowl, an electric circuit connecting said clutch member to said slips, normally open switch means in said circuit positioned in said slips, said switch means being adapted to be closed upon insertion of said slips in said slip bowl to thereby close said circuit and release said clutch member, and a rotatable inductive coupling positioned in said circuit between the rotary table and said clutch member, said coupling including interacting coils separately mounted in inductive relationship to each other on said relatively movable elements of said rotary table respectively.

5. In apparatus according to claim 3, wherein said rotatable inductive coupling comprises a pair of spaced annular induction coils positioned concentrically with respect to the vertical axis of said rotary table, one of said coils being adapted to rotate with said rotary table and having electrical connection to said switch member and the other of said coils being fixed against rotation and having electrical connection to said clutch member.

6. In apparatus of the class described, a rotary table including relatively movable elements, electrically operated mechanism separated from said rotary table but adapted to be actuated by the movements of drilling tools relative to said rotary table, an electric circuit connecting said rotary table to said mechanism, switch means in said circuit positioned at said rotary table and operable by said movements to alter the current flow in said circuit to thereby actuate said mechanism, and a rotatable inductive coupling in said circuit between said rotary table and said mechanism whereby electrical coupling is maintained therebetween without physical connection, said coupling including interacting coils separately mounted in inductive relationship to each other on said relatively movable elements of said rotary table respectively.

7. In apparatus of the class described, a rotary table including relatively movable elements, electrically operated mechanism separated from said rotary table but adapted to be actuated by the movements of drilling tools relative to said rotary table, an electric circuit connecting said table to said mechanism, a normally open switch in said circuit positioned in said rotary table and adapted upon closing thereof by said movements to actuate said mechanism and a rotatable inductive coupling in said circuit between said rotary table and said mechanism whereby electrical coupling is maintained therebetween without physical connection, said coupling including interacting coils separately mounted in inductive relationship to each other on said relatively movable elements of said rotary table respectively.

8. In apparatus of the class described a rotary table, a relatively stationary member spaced from said table, electrically operated mechanism separated from said rotary table but adapted to be actuated by movements of drilling tools relative to said rotary table, an electric circuit connecting said table to said mechanism, a normally open switch member positioned in said rotary table and adapted upon closing thereof by said movements to actuate said mechanism, and a rotatable inductive coupling in said circuit, said coupling comprising a pair of annular induction coils spaced apart and positioned concentrically with respect to the vertical axis of said rotary table, one of said coils being attached to said rotary table and adapted to rotate therewith and having electrical connection to said switch member, and the other of said coils being fixedly attached to said relatively stationary member and having electrical connection to said mechanism.

9. In apparatus according to claim 6 wherein said rotatable inductive coupling comprises a first induction coil, annular in form positioned concentrically with respect to the axis of rotation of said rotary table and fixed against rotation relative thereto, and a second induction coil affixed to the rotary table and adapted to rotate therewith in a path concentric with said first coil.

JOHN T. HAYWARD.
ELIHU H. COOLEY.